3,537,846
WELDING WIRE AND WELDING STRIP FOR CLADDING STAINLESS LAYERS ON UNALLOYED AND LOW-ALLOYED STRUCTURAL STEELS AND FOR OTHER PURPOSES WHERE A STAINLESS FILLER MATERIAL WITH HIGH CHROMIUM AND NICKEL CONTENTS IS REQUIRED
Leif Evert Rick, Lars Olof Lennart Jansson, and Jan-Christer Henric Ovesson Carlen, Sandviken, Sweden, assignors to Sandvikens Jernverks Aktiebolag, Sandviken, Sweden, a corporation of Sweden
No Drawing. Filed Oct. 16, 1967, Ser. No. 675,313
Claims priority, application Sweden, Oct. 21, 1966, 14,383/66
Int. Cl. C22c 39/20
U.S. Cl. 75—128                        8 Claims

ABSTRACT OF THE DISCLOSURE

A stainless chromium-nickel alloy composition for cladding a stainless layer on a structural steel article is characterized by high contents of chromium and nickel and by a very low content of carbon, the convention content of carbon having been replaced by a significant addition of nitrogen.

---

The present invention relates to a stainless filler material having high chromium and nickel contents, extraordinary low carbon content and a nitrogen content exceeding 0.08% but below 0.25%. It is primarily intended for use in cladding stainless layers on unalloyed and low-alloyed structural steels, but it is also useful for welding materials which are to be used at high temperatures or for other purposes where high chromium and nickel contents and low carbon content in the filler material are required. The hot working properties in manufacturing the filler material are good and the weld deposit obtains good strength properties. The alloy is mainly austenitic and contains besides iron and inevitable impurities 22–27% Cr, 11–15% Ni, up to 0.03% C, preferably 0.005–0.025% C, up to 1% Si, 0.1 to 3% Mn, up to 0.03% P, up to 0.03% S and 0.08–0.25% N.

Cladding stainless layers on unalloyed and low-alloyed structural steels, often with strips as fillers, is a method which becomes more and more common. One of the problems when welding in this way is that martensite is (or tends to be) formed, which molecular structures causes hardening cracks.

One possible mode of avoiding formation of martensite is to use a pronouncedly high alloyed material, i.e. with higher contents of chromium and nickel than 18 respectively 8%.

High alloyed filler materials like this, e.g. the American standard quality AWS–ASTM ER 309, are being used in welding objects which are to be used at high temperatures. A typical analysis corresponding to this specification is: C=0.087; Si=0.37%; Mn=1.74%; Cr=24.1%; Ni=13.7%; Mo=0.10% and N=0.05% (balance essentially all iron). The high-temperature strength of this material is considerably influenced by its carbon content, a high carbon content being preferred. Filler materials of this type are, therefore, usually manufactured with a carbon content of about 0.10%, at which value good hot working properties in manufacturing the steel are also achieved. However, tests of the weld deposit has shown that this alloy—because of its high carbon content—is sensitive to intergranular corrosion. Intergranular corrosion appears in such a way that chromium carbides are formed in the grain boundaries of the material when the material is exposed to temperatures between 500° C. and 900° C., whereby the nearest surroundings are depleted of chromium, and therefore, sensitive to corrosion.

It is possible to prevent precipitation of these chromium carbides, e.g. by adding a stabilizing element, for example, niobium; or, by decreasing the carbon content. For our invention we have chosen the latter alternative. Because of penetration into the base metal, the carbon content increases in the weld deposit and, therefore, the carbon content in the filler material has to be lower than the content in the weld deposit, less than 0.04%, which latter value is the maximum consistent with the desired properties. Thus, we have found that the carbon content in the filler material has to be, at maximum, 0.03% preferably 0.005–0.025%. In order to manufacture a welding wire with such a low carbon content, other steps have to be taken, which are characteristic for the invention and which will be described hereinbelow. A welding wire with said extremely low carbon content is attended by considerable advantages compared to earlier-known niobium-stabilized materials. Especially, the resistance to corrosion in the weld deposit is improved as well as general welding properties, e.g. increased fluidity and decreased risk of hot cracking.

However, a mere decrease in carbon content deteriorates the hot workability of this type of alloy so much that the manufacture of the wire is made considerably harder. A decrease of the carbon content to 0.02% increases the ferrite content to 15–20% at the hot working temperature in this type of material, the presence of which content of ferrite causes difficulties in the hot-working operation. However, we have discovered that the carbon content may be decreased to the desired level without undesired ferrite formation if a small amount of nitrogen is added to the alloy composition. In doing so, intergranular corrosion is prevented without difficulties in hot-working appearing and without the strength of the weld deposit being deteriorated.

To get good hot-working properties in this type of alloy it is desirable that the ferrite content does not exceed 8%, and preferably lies below 5%. The increase in ferrite content which normally results when the carbon content is decreased is counteracted by adding nitrogen. A nitrogen content of 0.15% gives e.g. a content of ferrite of about 4% at the hot-working temperature if the carbon content is 0.02% in an alloy containing (besides iron) 24% Cr, 13.5% Ni, 0.4% Si, and 1.8% Mn. On the other hand, it is essential that the ferrite content be high enough to prevent cracking when welding while being low enough not to decrease the corrosion-resistance of the alloy material.

A possible explanation of our prevention of intergranular corrosion when carbon to some degree is replaced by nitrogen is that the intermediate phase, chromium nitride, which is formed from chromium and nitrogen is not precipitated in the grain boundaries in the material but is equally dispersed in the matrix, in which event no local depletion of chromium then occurs.

The favorable effect of the carbon on the high-temperature strength is caused by this alloying element being interstitially dissolved in the steel and thereby effecting a heavy solid solution hardening. However, nitrogen is also dissolved in the same way, and it has been found that in adding nitrogen to a filler material with law carbon content an equally high temperature strength of the weld deposit is achieved as is achieved with a filler material having a high carbon content.

The filler materials according to the invention are thus equally suitable for welding high temperature materials as earlier known fillers, e.g. the American standard quality AWS ASTM ER 309.

It is of great importance for the invention how the added nitrogen behaves in the welding. It has been found that nitrogen contents more than 0.25% tend to influence an undesirable porosity of the product. The nitrogen content should not exceed 0.20%, and preferably it should not be more than 0.18%. On the other hand, if the nitrogen content is below 0.08%, the earlier-mentioned difficulties in hot-working will appear. Hence, the nitrogen content shall be more than 0.10%, and a suitable nitrogen range is 0.08–0.25%, more especially 0.08–0.20%, and most suitable 0.10–0.18% nitrogen. Besides iron and inevitable impurities, the filler material contains: 22–27% Cr; 11–15% Ni; up to 0.04% C; up to 1% Si; 0.1 to 3% Mn; up to 0.03% P; up to 0.03% S; and 0.08–0.25% N. As one specific example of a filler material according to the invention the following may be given: 23.5–24.5% chromium; 13–14% nickel; up to 0.025% carbon; up to 0.50% silicon; 1.5–2.5% manganese; up to 0.02% phosphorus; up to 0.02% sulphur; 0.10–0.18% nitrogen and the remainder iron.

Besides the earlier mentioned advantages in resistance to corrosion and in high temperature strength, the invention makes it possible to manufacture wire or strip using simple and economically advantageous methods. A welded joint with as low a carbon content as this also admits of using the welded objects within a considerably widened temperature range.

It was for example used for a furnace detail in welding together two parts of heat resisting castings of a composition corresponding to the American standard quality A ISI 309. Submerged arc welding was the method used and the filler material had the analysis: C=0.020, Si=0.35, Mn=1.76, P=0.008, S=0.011, Cr=24.0, and Ni=13.6.

We claim:

1. Welding wire and welding strip especially for cladding which in the main consists of austenitic stainless steel with high contents of chromium and nickel and low carbon content, characterized in that it consists essentially of, besides iron and inevitable impurities: 22–27% chromium; 11–15% nickel; up to 0.03% carbon; up to 1% silicon; 0.1 to 3% manganese; up to 0.03 phosphorus; up to 0.03% sulphur and 0.08–0.25% nitrogen.

2. Welding wire and welding strip according to claim 1, characterized in that the nitrogen content is 0.08–0.20%.

3. Welding wire and welding strip according to claim 1, characterized in that the carbon content is 0.005–0.025%.

4. Welding wire and welding strip according to claim 1, characterized in that the nitrogen content is 0.10–0.18%.

5. Welding wire and welding strip according to claim 1, characterized in that the chromium content is 23.5–24.5%.

6. Welding wire and welding strip according to claim 1, characterized in that the nickel content is 13–14%.

7. Welding wire and welding strip according to claim 1, characterized in that it contains up to 0.025% carbon.

8. Welding wire and welding strip according to claim 1, characterized in that the content of manganese is 1.5–2.5%.

References Cited

UNITED STATES PATENTS

| | | | |
|---|---|---|---|
| 2,121,391 | 6/1938 | Arness | 75—128.5 |
| 2,588,700 | 3/1952 | Carpenter | 75—128.5 |
| 2,891,859 | 6/1959 | Kegerise | 75—128.5 |
| 3,129,120 | 4/1964 | Smith | 75—128.5 |
| 3,152,934 | 10/1964 | Lulg | 75—128 |
| 3,303,023 | 2/1967 | Dulis | 75—128.5 |
| 3,306,736 | 2/1967 | Rundell | 75—128.5 |

HYLAND BIZOT, Primary Examiner